United States Patent [19]

Kuperman et al.

[11] Patent Number: 4,510,525
[45] Date of Patent: Apr. 9, 1985

[54] STEREOSCOPIC VIDEO IMAGERY GENERATION

[75] Inventors: Gilbert G. Kuperman; Fred R. Bodine, both of Dayton, Ohio

[73] Assignee: The United States of America as represented by the Secretary of the Air Force, Washington, D.C.

[21] Appl. No.: 361,016

[22] Filed: Mar. 23, 1982

[51] Int. Cl.³ .............................................. H04N 3/02
[52] U.S. Cl. ...................................... 358/88; 358/92; 352/59; 352/62
[58] Field of Search ...................... 358/88, 109, 89, 90, 358/91, 92; 352/62, 57, 60, 58, 61, 59

[56] References Cited

U.S. PATENT DOCUMENTS

| | | | |
|---|---|---|---|
| 2,495,790 | 1/1950 | Valensi | 358/114 |
| 3,109,057 | 10/1963 | Slavecki | 358/109 |
| 3,564,133 | 2/1971 | Hobrough | 178/6.8 |
| 3,595,995 | 9/1968 | Hobrough | 178/6.8 |
| 3,636,254 | 1/1972 | Johnston | 358/88 |
| 3,705,261 | 12/1972 | Langley | 178/6.5 |
| 3,860,752 | 1/1975 | Adler et al. | 178/7.3 D |
| 3,912,856 | 10/1975 | Liddel et al. | 178/6.5 |

OTHER PUBLICATIONS

Overview, A Life-Long Adventure in Aerial Photography, (Doubleday & Co., Inc., Garden City, NY, 1969), pp. 241–244, by George W. Goddard, et al.

Primary Examiner—John C. Martin
Assistant Examiner—Edward L. Coles
Attorney, Agent, or Firm—Donald J. Singer; Bernard E. Franz

[57] ABSTRACT

Flying spot scanner technology is combined with stereo photography in motion to produce two channels of video imagery which can be optically combined to produce the perception of dynamic stereoscopic detail. The scanner generates alternate lines with lateral offset corresponding to the physical separation between stereo photographic pairs to provide two rasters.

3 Claims, 3 Drawing Figures

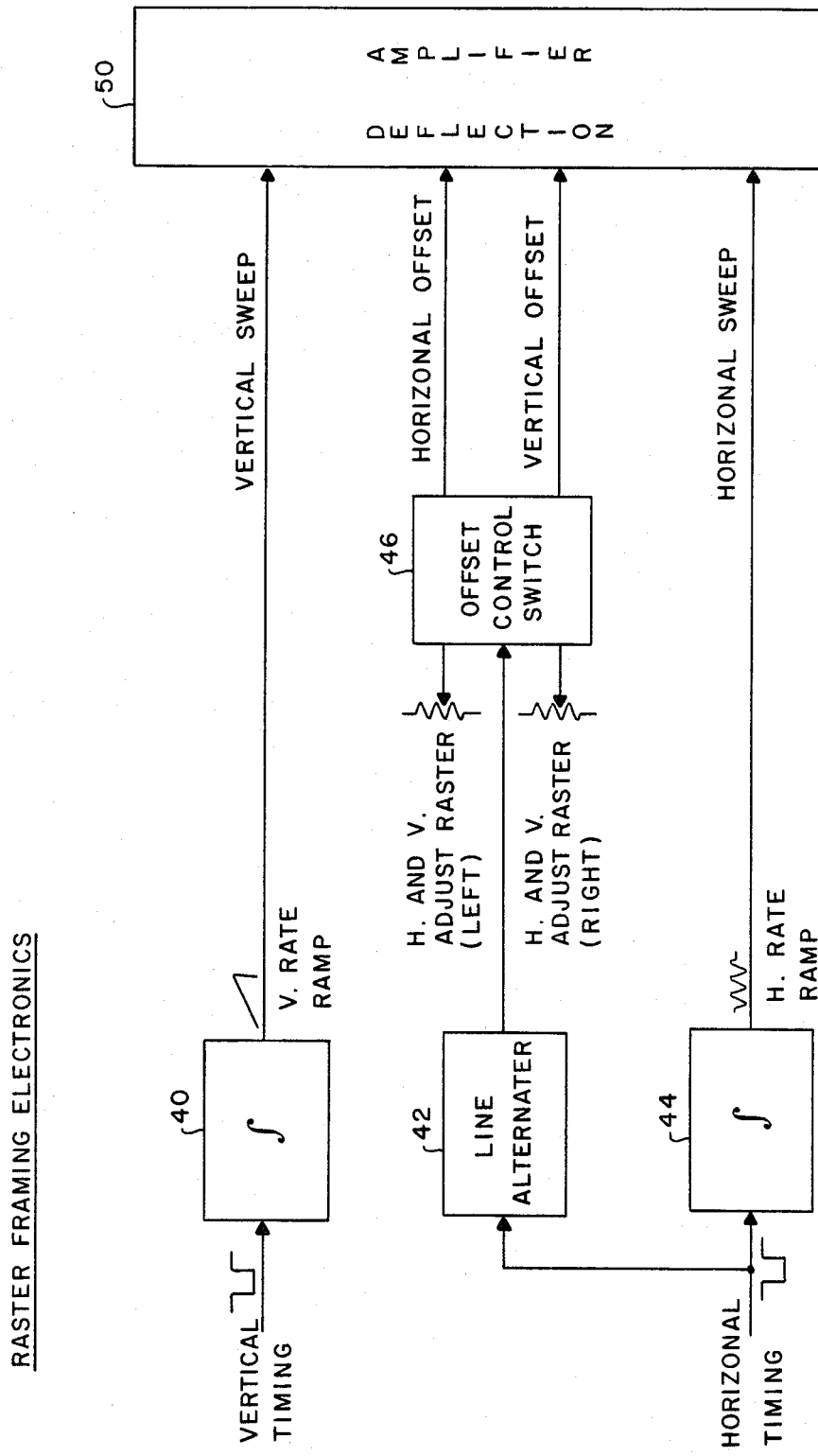

STEREOSCOPIC VIDEO IMAGERY GENERATION

RIGHTS OF THE GOVERNMENT

The invention described herein may be manufactured and used by or for the Government of the United States for all governmental purposes without the payment of any royalty.

BACKGROUND OF THE INVENTION

This invention relates to the generation of stereoscopic video imagery, and more particularly to an optical system in which imagery from moving photographic film is displayed in stereoscopic video form.

For the training of personnel, it is often desirable to simulate a view of the terrain as viewed in flight. The simulation of stereoscopic video is of use in system design and operator training for obstacle detection, reconnaissance, and aerial refueling tasks.

Prior approaches to generating stereo video are based on using two input channels (i.e. two cameras or two recorders) and preclude interaction with the generated imagery. There also may be annoying display flicker.

Computer generated imagery is commonly perceived as being totally artificial (cartoonish), and it is not known to have been done in stereo. It is extremely expensive to produce.

Terrain boards or belts are now used for simulation. Stereo would require dual television systems, and would be difficult and expensive. It could not be accomplished with a single optical probe. There is no parallax. A system would require two cameras and two video channels.

There are many known systems for generating stereoscopic displays, which include means to control geometric distortions and other factors. For example, Pat. No. 3,564,133 teaches a method for transforming the scanning raster of a flying spot scanner to correct for distortion with respect to a reference of an image being scanned by the scanner. Pat. No. 3,595,995 discloses an improved method for establishing complex high order transformations which are necessary when correlating stereo photographs of rough terrain. Pat. No. 3,705,261 shows a system for exposing a pair of visual read-outs or photographs which can be viewed as a stereoscopic image of an object. Pat. No. 3,860,752 teaches a virtual image viewing system which includes a flying spot scanning means that is responsive to deflection signals and also receives a laser beam for deflecting the beam in two dimensions and for converging the beam to form an unmodulated flying spot raster. Pat. No. 3,912,856 shows a three-dimensional image transmitting apparatus comprising a scanning beam which scans a subject and reflects therefrom, and a signal screen which generates an electrical location signal that corresponds with the location of incidence of the reflected beam on the screen, the contour of the scanned subject being formed on the screen, and electrical signals corresponding to the contour being transmitted to a device for reconstructing a three-dimensional image of the subject.

The strip camera was an important breakthrough in aerial photography in the late 1930's. Its early development and some of its history is noted in a book by George W. Goddard, et al, "Overview, A Life-Long Adventure in Aerial Photography" (Doubleday & Company, Inc., Garden City, N.Y. 1969) starting at pages 241–244. On page 243 it is noted that Andy Matos developed a most valuable feature by using twin lenses to produce stereoscopic photographs in black and white and color. The strip camera does not use a shutter. The camera takes a continuous panoramic picture, the film moving across a long, narrow open slit in the center of the focal plane. The long dimension of the slit is perpendicular to the line of flight. The design concept depends on the speed of the film moving past the camera focal plane governed by the aircraft speed, its altitude, and the focal length of the camera lens. It is important to synchronize the film's movement with the movement of the image in the camera. In current stereoscopic strip cameras, two lenses are fixed relative to one another, with a tilt of, typically, seven degrees between them.

SUMMARY OF THE INVENTION

An object of the invention is to provide a stereoscopic video system simulation of aerial views which is simple, effective, inexpensive, and free of distortions and other objectionable factors.

In the system according to the invention, flying spot scanner technology is combined with stereo photography (preferably from a strip camera) to produce two channels of video imagery which can be optically combined to produce the perception of dynamic stereoscopic detail.

A feature relates to the use of a flying spot scanner for generating alternate lines with lateral offsets corresponding to the physical separation between stereo photographic pairs and the high line rate, which allows the generation of two channels of standard video at conventional video field/frame rates.

This system combines raster generation and timing, photographic parameters, and optical methods to generate video sources which have perceivable depth. The high line rate and conventional field rate preclude display flicker.

BRIEF DESCRIPTION OF THE DRAWING

FIG. 3 is a functional block diagram of the raster forming electronic circuits.

DETAILED DESCRIPTION

Figure 1:
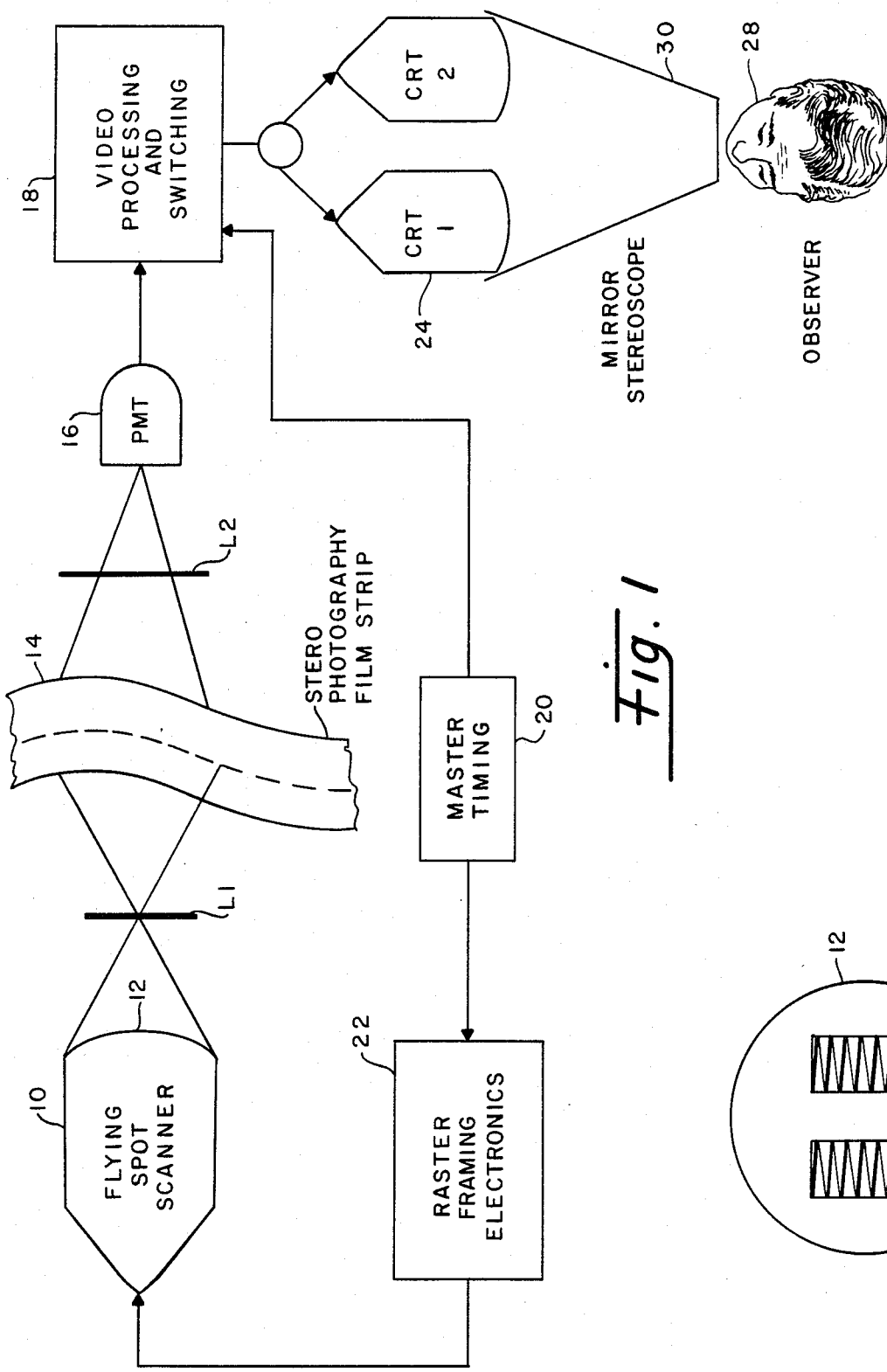
FIG. 1 is a symbolic block diagram of a stereoscopic system according to the invention.

Referring to FIG. 1, the system makes use of a stereoscopic photography film strip 14 which has been obtained so that the camera station has translated a baseline distance, B, between exposures (or preferably with a stereo strip camera). The film 14 is placed at the film plane of a flying spot scanner 10. Translation of the film is proportionate to velocity at the observer.

Figure 2:
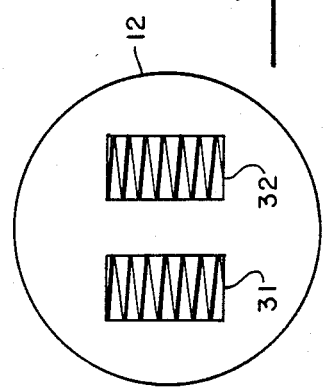
FIG. 2 is a view of the face of the flying spot scanner showing the raster generated.

A high line rate video raster is generated on the flying spot scanner tube face 12 (FIG. 2) such that alternate lines are offset to create two areas 31 and 32, under control of the master timing 20 and the raster framing electronics 22. Both areas 31 and 32 are created at the conventional field rate of sixty hertz.

Light from the raster is optically reduced (or magnified) by a lens L1 to transilluminate the photographic film 14. Note that the film has been exposed in the stereo camera such that the exposure from one of its lenses is on the left side of the film and the exposure from the other lens is on the right. The transillumination then in the system as shown in FIG. 1 is such that light from area 31 transilluminates one side of the film 14, and that from area 32 transilluminates the other side of the film.

The transmitted light, modulated by the photographic scene, is collected by a lens L2 and brought to a light responsive surface of a photomultiplier tube 16, which produces an electrical signal proportionate to the light received.

This signal is video processed in unit 18. The output signal is switched with alternating raster lines to the two video monitors 24 and 26 such that each monitor receives a conventional 525-line rate video signal.

The observer 28 views the cathode ray tubes of the pair of video monitors 24 and 26 with the aid of a mirror stereoscope. Apparent relief in the viewed stereo model is perceived. Further, by real-time manipulation of the raster line spacing and spot/line velocity, apparent perspective may be created.

Instead of a mirror stereoscope, other methods of stereoscopic viewing may be used, such as polarized or colored light, with the viewer wearing appropriate glasses.

FIG. 3 shows the raster framing electron circuits of block 22 in more detail. The vertical and horizontal timing signals received from the master timing circuits 20 are supplied respectively to integrator circuits 40 and 44 to generate the vertical and horizontal rate ramps, which are used to control the vertical and horizontal sweep in the deflection amplifier 50. The horizontal timing signal is also supplied to a line alternator circuit 42, to cause alternate horizontal lines to form the rasters 31 and 32. The output from circuits 42 controls an offset control switch 46, which supplies horizontal and vertical offset signals to the deflection amplifier 50. The switch 46 controls for horizontal and vertical adjust for both the left and the right raster.

In summary, the rasters 31 and 32 of the flying spot scanner 10 are formed so that first one line is formed at the top of raster 31 with successive spots across the line which illuminate one side of the film 14, and result in one line of video being formed across the top of the face of monitor 24. Next, one line is formed at the top of raster 32 which illuminates the other side of the film 14 and results in one line formed on monitor 26. Then a second line is formed on raster 31 which forms a line on monitor 24, followed by a second line from raster 32 resulting in a line formed on monitor 26, continuing with alternating lines from the two rasters to produce alternating lines on the two monitors until each forms a complete frame of 525 lines. The process is then repeated for successive frames. In this manner the scene on monitor 24 corresponds to the imagery on one side of film 14, and the scene on monitor 25 corresponds to the imagery on the other side of the film.

One use of the system is to simulate dynamic viewing of terrain from an aircraft. The original stereo film is obtained from a camera station on an aircraft. With a shutter camera, the aircraft should move a proper baseline distance between exposures. With a shutterless strip camera, the speed of the film is synchronized with the speed of the aircraft such that a single long continuous image is obtained. Then in generating imagery in the system of FIG. 1, the film is moved through the film plane of the flying spot scanner at the proper synchronized rate, so as to create for the observer the perception of motion over the terrain in apparent relief.

Thus, while preferred constructional features of the invention are embodied in the structure illustrated herein, it is to be understood that changes and variations may be made by the skilled in the art without departing from the spirit and scope of my invention.

We claim:

1. A system for generation of stereoscopic video imagery from photographic film which has stereoscopic pairs on first and second separate parallel strips along its length, said system comprising:

flying spot scanner means for producing first and second unmodulated rasters which respectively alternately transilluminate said first and second strips in its film plane to modulate the light; in which the flying spot scanner means includes raster forming means and a single scanner face, wherein the raster forming means generates raster lines at a double rate, and alternate lines have a lateral offset corresponding to the physical separation between stereo photographic pairs on said first and second strips, to thereby provide said first and second rasters on the single scanner face, with each raster having a given line and frame rate with both horizontal sweep and vertical sweep according to a conventional standard;

light detecting means comprising a single photomultiplier tube for detecting the modulated light;

video processing means coupled to the light detecting means to produce video signals corresponding to the modulated light;

switching means for separating the video signals into first signals which result from illumination of said first strip by the first raster and second signals which result from illumination of said second strip by the second raster, so that said video processing means and said switching means generates two channels of video at said given video field and frame rates, and for supplying the first and second signals to provide imagery respectively on the first display area and the second display area;

means for moving said film through the film plane of the flying spot scanner means so that successive images are illuminated in successive frames; and stereoscopic means for viewing said first and second display areas.

2. A system according to claim 1, wherein said video monitor means comprises two separate video monitors for providing respectively said first and second display areas.

3. A system according to claim 1 or 2 for use with photographic film in which the stereoscopic photography has been obtained by a camera station in an aircraft flying over selected terrain with film moving at a synchronized rate corresponding to the speed of the aircraft over the terrain; and wherein said means for moving the film through the film plane advances the film at a synchronized rate, so that an observer at said viewing means perceives motion over said terrain in apparent relief.

* * * * *